US011792279B1

(12) United States Patent
Gordon et al.

(10) Patent No.: US 11,792,279 B1
(45) Date of Patent: Oct. 17, 2023

(54) INTELLIGENT DOWNLOAD AND SESSION COPY

(71) Applicant: Microsoft Technology Licensing, LLC, Redmond, WA (US)

(72) Inventors: Ariel Gordon, Brooklyn, NY (US); Sakshi Tiwari, Bothell, WA (US); Aaron Kyle Damashek, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/956,502

(22) Filed: Sep. 29, 2022

(51) Int. Cl.
*H04L 67/00* (2022.01)
*H04L 9/40* (2022.01)
*G06K 7/14* (2006.01)
*H04L 67/141* (2022.01)

(52) U.S. Cl.
CPC ............ *H04L 67/34* (2013.01); *G06K 7/1417* (2013.01); *H04L 63/08* (2013.01); *H04L 67/141* (2013.01)

(58) Field of Classification Search
CPC ....... H04L 67/34; H04L 63/08; H04L 67/141; G06K 7/1417
See application file for complete search history.

(56) References Cited

U.S. PATENT DOCUMENTS

| 2011/0219105 | A1 | 9/2011 | Kryze et al. |
| 2013/0212289 | A1 | 8/2013 | Krishnakumar et al. |
| 2014/0367461 | A1 | 12/2014 | Raina |
| 2015/0358410 | A1 | 12/2015 | Chandrasekaran et al. |
| 2020/0084283 | A1* | 3/2020 | Huang .................... H04L 67/01 |
| 2020/0334433 | A1* | 10/2020 | Hu ........................ G06Q 20/386 |
| 2021/0055893 | A1* | 2/2021 | Saigusa .................. H04L 67/34 |
| 2021/0064730 | A1* | 3/2021 | Schrag .................... H04W 4/14 |
| 2021/0099868 | A1 | 4/2021 | Damlaj et al. |
| 2021/0409402 | A1* | 12/2021 | Tulshibagwale ........ H04L 63/08 |
| 2022/0150990 | A1* | 5/2022 | Kong ..................... H04W 12/06 |
| 2022/0215192 | A1* | 7/2022 | Xing ...................... G06V 10/19 |

OTHER PUBLICATIONS

Alapetite, Alexandre, "Dynamic 2D-barcodes for multi-device Web session migration including mobile phones", In Journal of Personal and Ubiquitous Computing, Apr. 2, 2009, 14 Pages.

* cited by examiner

*Primary Examiner* — Michael A Keller
*Assistant Examiner* — Thao D Duong
(74) *Attorney, Agent, or Firm* — Schwegman Lundberg & Woessner, P.A.

(57) ABSTRACT

Disclosed in some examples, are methods, systems, devices, and machine-readable mediums that use one or more images (e.g., Quick-Response (QR) codes) displayed by a first application to both provide the location to obtain a second application and to copy a session from the first application to the second application once downloaded. In some examples, a session comprises an authentication session such that, when the session is copied, the user is logged into a network-based service within the second application with a same account as the user is already logged into with first application.

20 Claims, 7 Drawing Sheets

INTELLIGENT DOWNLOAD AND SESSION COPY

TECHNICAL FIELD

Embodiments pertain to software application security. Some embodiments relate to securely downloading an application and transferring a session across applications.

BACKGROUND

As the computational power of hardware processors, memory devices, and other electronic devices has increased and the associated cost of those devices has decreased, the number of computing devices typically owned by a person has increased. For example, users may have one or more desktops; laptops; mobile devices such as a cellphones or tablets; smart watches, smart glasses, or other devices. These devices may be powered by different types of processors with different instruction sets. In addition, these devices may each have different operating systems.

As a result, an application that is compatible with a first device may be incompatible with a second device. In addition, each different device type may have different physical characteristics and form factors necessitating a different Graphical User Interface (GUI). Thus, a first version of an application that is written for a first computing device may not be easy to use on a second computing device.

Application developers have thus created different application versions for different hardware and operating system platforms. While these different versions share some functionality and features, they are customized for the platform they are designed for. For example; a unified communication application such as Microsoft® Teams® may have versions for personal computers (PCs), Apple® OS devices, Android® devices, and Apple iOS devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
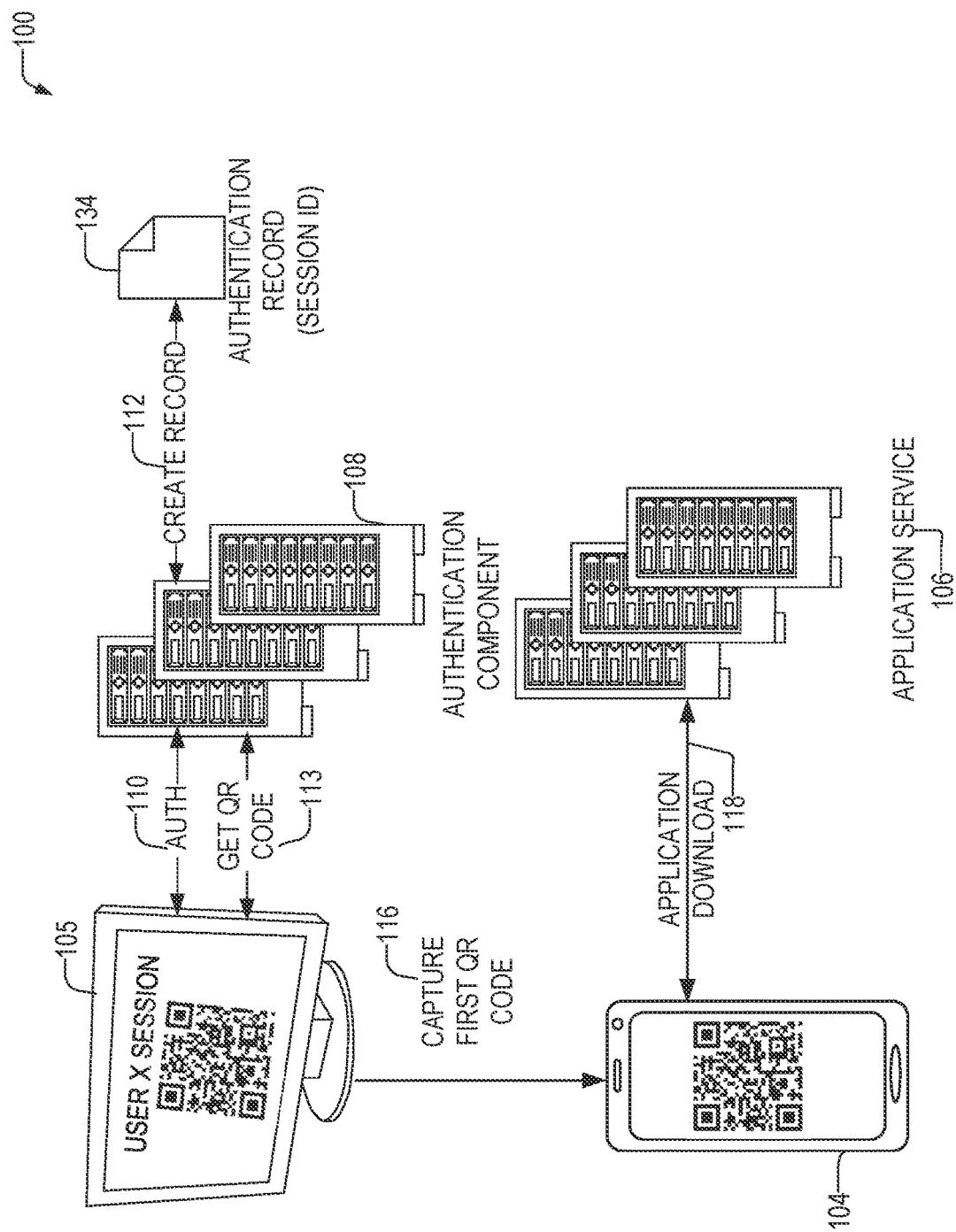
FIG. 1 illustrates an example diagram of an application download according to some examples of the present disclosure.

Users may not be aware that a software developer has a version available for their other devices. Even if the user is aware, the user may hesitate to download these versions as it may require additional steps to download and to setup. For example, users may not be aware of where to obtain these other versions. Even if the device has a specialized website to download and/or purchase applications, other applications listed on these websites may unscrupulously try and trick users into downloading the wrong application. At best, this represents a significant annoyance to users, but at worst it could lead to malware, viruses, or other unwanted behavior. In addition, the user may have to authenticate with the application, which requires that they remember their login credentials. These factors may result in significant resistance to the adoption of applications across the supported device ecosystems. While these problems exist for different versions of an application, they also exist for a same version for a second device. For example, a user may have multiple personal computers, but may be hesitant to obtain a second application for the second computing device due to the previous discussed issues. Furthermore, users may be hesitant to deploy related applications on a same machine due to some of the above issues.

Disclosed in some examples, are methods, systems, devices, and machine-readable mediums that use one or more images (e.g., Quick-Response (QR) codes) displayed by a first application to both provide the location to obtain a second application and to copy a session from the first application to the second application once downloaded. In some examples, a session comprises an authentication session such that, when the session is copied, the user is logged into a network-based service within the second application with a same account as the user is already logged into with first application. Providing download links and session copy thus provides a way for a user to easily use a first application to download and log into a second application without the need for a username and password or other credentials. This system thus lowers two of the inhibitors of adoption of the second application.

In some examples, the first application provides a first image (such as a QR code) with a link to download the second application within a GUI of the first application. The user utilizes an image capture device and application to capture the first image and decode the link within the image to obtain the second application. This first image, in some examples, includes a session id of a session between the first application and a network-based service.

Upon downloading the second application and executing it, in some examples, the session id is passed to the second application upon initial execution—for example, by a download service or an operating system. This triggers the second application to enter a session copy initial setup flow. The second application sends the session id to the network-based service. The network-based service then causes the first image displayed by the first application to be replaced with a second image. The second image is encoded with an authentication secret. The authentication secret is an authentication secret used by the first application or is an authentication secret created by the network-based service for the second application.

If the second application has not passed a session id, in some examples, the second application provides the user an option in an initial setup flow to copy a session. The option, when selected by the user, launches an image capture mode of the second application. The user then captures the first QR code again. The second application recognizes that the QR code encodes the download link of the second application and a session id. The download link can be ignored and the session id is then sent to the network-based service as described before which triggers replacement of the first image with the second image.

The second application then captures the second image, which encodes the authentication secret, which is used to authenticate with the network-based service (either directly, or through an authentication component). The usage of the images to encode the download link and/or the authentication secrets removes the need for users to manually click through multiple setup steps on the second application and enter their credentials. In some examples, the user does not have to manually take a picture of the first or second images, but the image capture application(s) may automatically capture the image when a QR code or other image encoded with one or more values are detected. Thus, the user is not aware of the replacement of the first and second images.

An application as used herein is a set of operating instructions that implements a set of functionalities. While the disclosure herein refers to a first and second applications having a core set of same functionalities and working with a same network-based service—such as a mobile application and a desktop application—in other examples, the applications can be different applications having different functionalities and/or working with a different network-based service (e.g., a network-based service that authenticates using a common authentication component between the first and second applications).

Turning now to FIG. 1, an example diagram 100 of an application download is shown according to some examples of the present disclosure. A user of a first application on first computing device 105—illustrated as a desktop computing device—authenticates at operation 110 with an authentication component 108 of a network-based service. In some examples, the authentication component 108 is part of the network-based service, but in other examples, it is a separate service—such as a federated identity service. The authentication creates an authentication secret or record 134 at operation 112 with a corresponding session ID.

In some examples, during usage of the first application, a user is presented with a prompt on the display of the first application on a first computing device 105 that a second application is available—such as a second application for one or more other computing devices. The user selects or otherwise indicates an option in the first application corresponding to the prompt to indicate a desire to obtain the second application. In response, the first application on the first computing device 105 displays a first image (e.g., as shown, a QR code) that encodes a location where the second application can be downloaded from. This image is created by the first application or by a network-based application service corresponding to the first application and provided to the first application at operation 113.

The user utilizes an image capture application with an image capture device of the second computing device 104 to capture the first image at operation 116. Once captured, the second computing device attempts to extract a location from the first image where the second application is obtained. If successful, in some examples, the application is automatically downloaded at operation 118. In other examples, one or more prompts confirm that the user wishes to download the application. Upon receiving a confirmation from the user, the application is downloaded at operation 118. In some examples the location includes a web address or other Universal Resource Locator (URI). In some examples, the location is an application server, such as application service 106.

In some examples, the first image encodes a session id, which is passed to the application service 106 or to an operating system of the second computing device 104. The session id in some examples is passed to the second application upon execution as a payload data object. In some examples, the general-purpose capture application used to capture and decode the link from the first image also reads the session identifier and pass that to the second application upon first execution. This session id is passed in some examples to the second application through the application service, network-based service, or an operating system of the second computing device 104. For example, the session id is passed in some examples to the application service 106 by being part of the download link URL. Example application services 106 include the Microsoft Store®, Apple® AppStore®, Google Play Store®, or the like.

Figure 2:
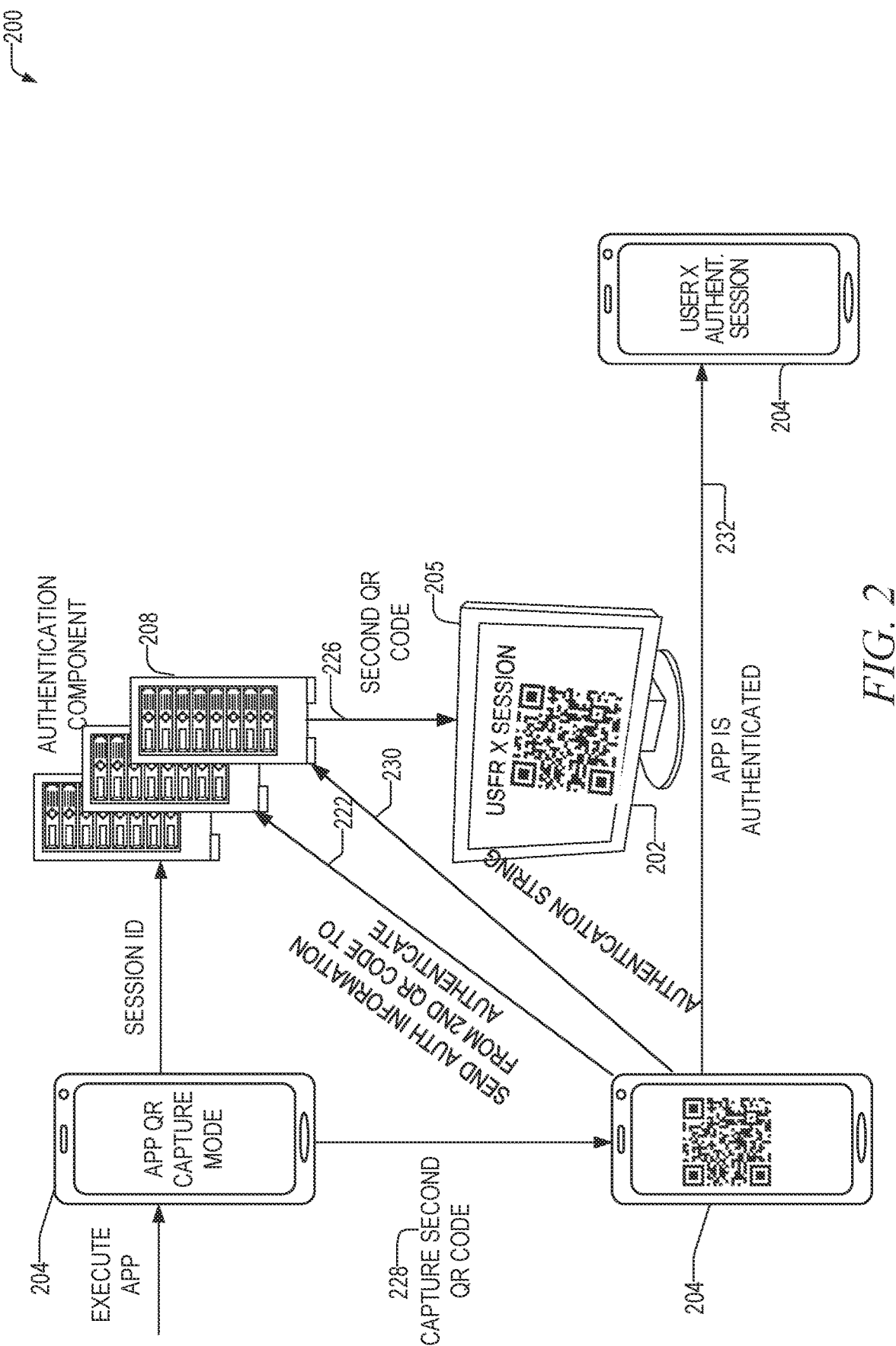
FIG. 2 illustrates an example diagram of a session copy is shown according to some examples of the present disclosure.

Turning now to FIG. 2, an example diagram 200 of a session copy is shown according to some examples of the present disclosure. In some examples, second computing device 204 is a same computing device as second computing device 104. In some examples, first computing device 205 is a same computing device as first computing device 105. In some examples, authentication component 208 is a same authentication component as authentication component 108. FIG. 2 occurs in some examples after the second application is downloaded, such as after FIG. 1 has concluded.

Once the second application is installed on the second device, upon first execution, the application enters a configuration mode to authenticate a user and to set up the application. This is referred to as a "first-run" user experience. As previously described, in some examples, the first image displayed in FIG. 1 also encodes a session identifier of the user's session between the first application and the network-based application service (or authentication component 108) corresponding to the first application. In some examples, the second application, upon first execution, recognizes that the operating system is passing in a session ID, for example, as a payload. In response, the second application infers that the user is trying to do a session copy from another device and will start the session copy flow using an image capture process instead of a traditional first run experience that includes a username and password entry. In these examples, the second application queries the authentication component 208 at operation 222 with the session ID. In response, the authentication component 208 may cause display of a second image on a display device coupled to the first computing device 205 by sending a second image to the first device 202 for display by the first device at operation 226. In some examples, the first image is replaced with the second image. In addition, the second application enters an image capture mode and captures the second image at operation 228. The second image has an encoded session authentication secret. The second application attempts to extract the session authentication secret in the second image. If the second application is successful, the second application sends the session authentication secret at operation 230 to the authentication component 108 to authenticate. If the authentication secret is accepted by the authentication component 108, the user is then logged in and may begin using the second application as an authenticated user at operation 232.

In other examples, the operating system of the second device does not pass the session id within the first image to the second application. In these examples, the second application, upon executing for the first time, provides an option within a first run flow for a user to authenticate using an image. Upon receiving input from the user that they wish to authenticate using an image, the second application enters an image capture mode. The second application captures the first image displayed by the first application. The second application decodes both the download link and the session id. The second application recognizes that the download link is to itself and ignores the download link. The second application then sends the session id to the authentication component at operation 222.

In response, the authentication component 208 causes, in some examples, display of a second image on a display device coupled to the first computing device 205 by sending a second image to the first device 202 for display by the first computing device at operation 226. In some examples, the first image is replaced with the second image. In addition, the second application enters an image capture mode and captures the second image at operation 228. The second image has an encoded session authentication secret. The second application attempts to extract the session authentication secret in the second image. If the second application is successful, the second application sends the session authentication secret at operation 230 to the authentication component 108 to authenticate. If the authentication component 108 accepts the authentication secret, the user is then logged in and may begin using the second application as an authenticated user.

As noted, the authentication secret is used by an application to call an Application Programming Interface (API) to utilize one or more functions of a network-based service. The authentication secret is assigned by the network-based service after first authenticating using secret credentials of the user. The authentication secret allows for securely authenticating the user in subsequent API calls after the initial authentication without potentially exposing the user's credentials. Thus, the authentication secret may be periodically changed without changing the user's credentials. Example authentication secrets include OAuth tokens and the like.

In still other examples, the second application leverages other signals indicating that the user is trying to copy a session from another device and automatically start or promote a session copy flow instead of a traditional first-run experience. For example, if the user has an active session on another device within a same local network. Upon first execution of the second application, the second application sends discovery messages over the local network. The first application in these examples, subscribes to receive discovery messages of this type and responds with a session id, and/or the session authentication secret. In other examples, the user selects an option within the first application of the second application to send discovery messages over the local network. The other application responds and a session copy may happen over the local network.

In yet other examples, an inaudible audio signal is sent by the first and/or second applications by audio reproduction devices (e.g., speakers) of the first and/or second devices which may be picked up by the other device. The audio signals encode the download link, the session id, and/or the session authentication secret in place of images. In yet another example, the system uses Bluetooth Low Energy or other short range wireless technology.

In some examples, just prior to authentication, the user is prompted with one or more confirmation GUIs. For example, on the second application, a confirmation is displayed that indicates that the second application is being signed in as a particular user. In some examples, the GUI has an option to cancel the sign in, or require a confirmation before proceeding with the sign in. The GUI, in some examples, has an option to restart the initial first run experience if they do not wish to sign in with this account. In some examples, on the first application, once the session is copied, the UI shows a "success" message.

The use of images to both provide a download link and to transfer a session provides a secure way of downloading and authenticating to an application. The use of visual methods ensures that transmission of the session information is limited to the visual range of the first computing device rather than transmitting it via other communication forms that may be intercepted. In addition, this solution removes the opportunity for malicious applications to pose as legitimate applications within websites, search results, and application download centers. The disclosed techniques thus solve the technical problem of secure application provisioning and session authentication using the technical solution of secure digital communication encoding such as by using images.

Figure 3:
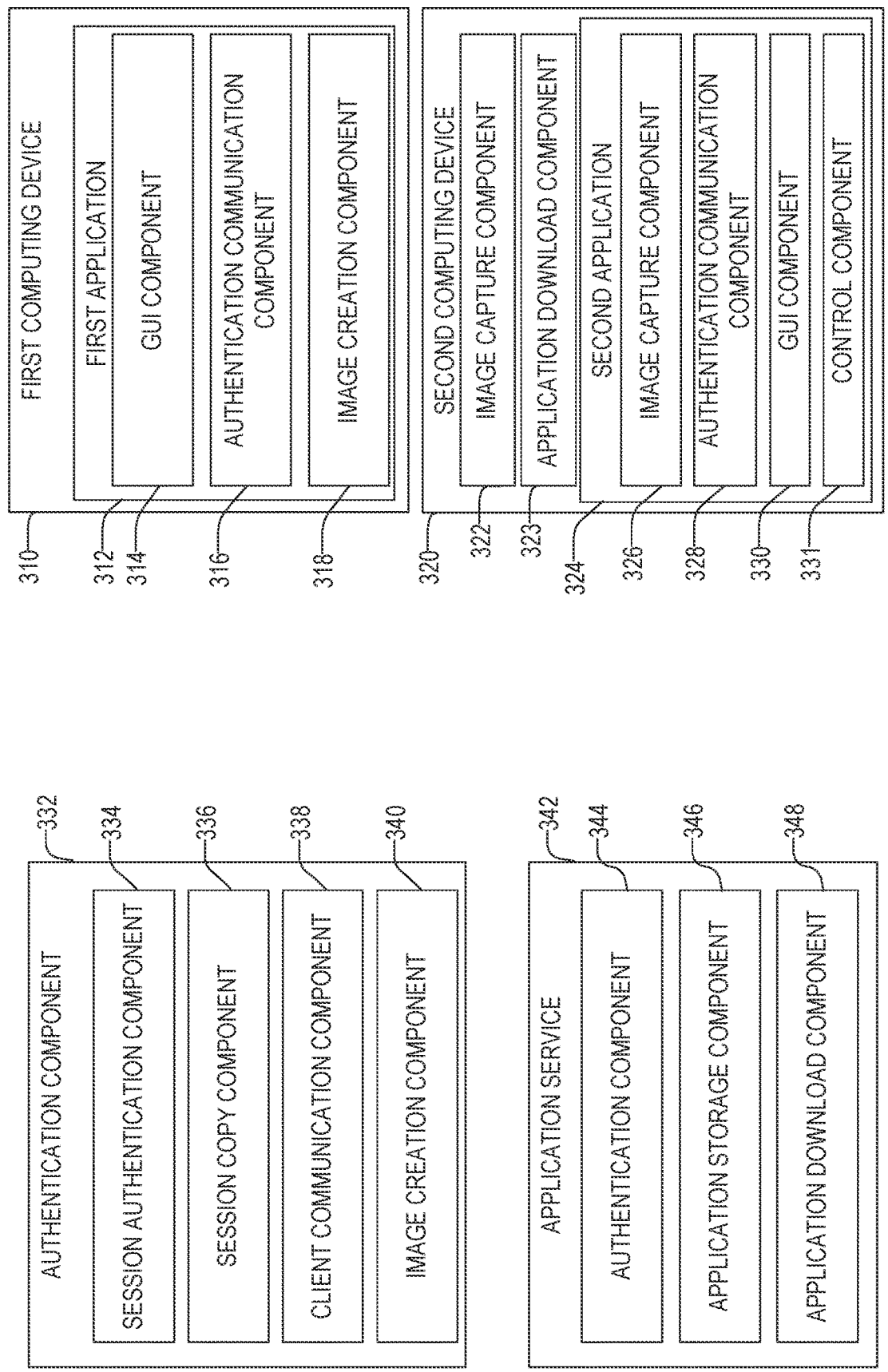
FIG. 3 illustrates logical block diagrams of an authentication component, application service, a first computing device, and a second computing device according to some examples of the present disclosure.
Figure 7:
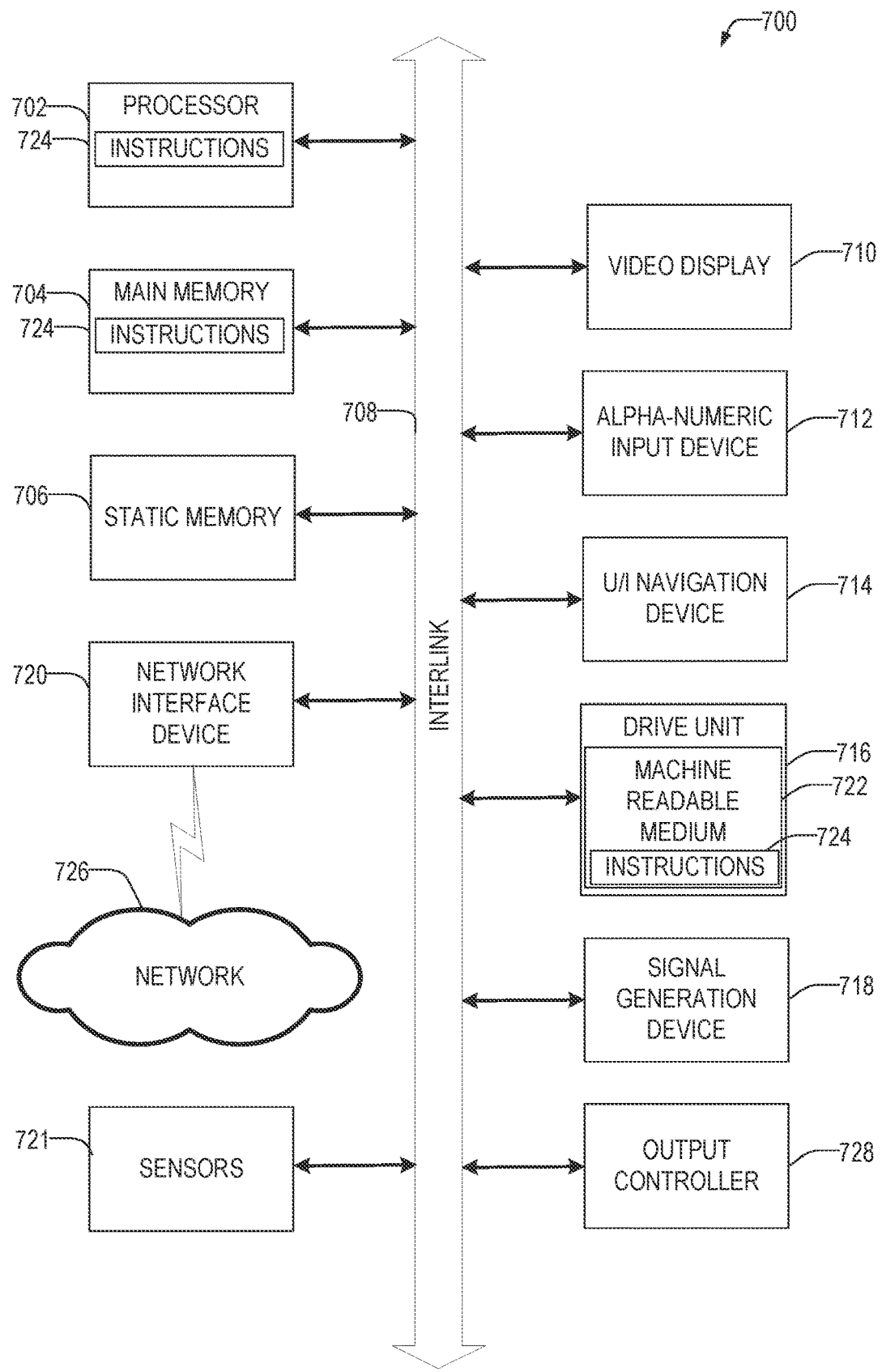
FIG. 7 is a block diagram illustrating an example of a machine upon which one or more embodiments may be implemented.

FIG. 3 illustrates logical block diagrams of an authentication component 332, application service 342, a first computing device 310, and a second computing device 320 according to some examples of the present disclosure. The components of FIG. 3 are exemplary, and one of ordinary skill in the art with the benefit of this disclosure will appreciate that additional components may be used. In addition, functionality from various components may be combined. The components in FIG. 3 may be implemented by one or more devices, such as shown in FIG. 7. For example, as software instructions that configures a hardware processor. In some examples, first computing device 310 may be a same computing device as first computing device 105, 205; second computing device 320 may be a same computing device as second computing device 104, 204; authentication component 332 may be a same authenticating component as authenticating component 108, 208; and application service 342 may be a same application service as application service 106.

First computing device 310 executes a first application 312. The first application 312 in some examples has a GUI component 314. GUI component 314 displays content associated with the application; provides user options, settings, and controls; and displays one or more images. In some examples, the GUI provide a notice to the user that there is a second application that is available for the user. For example, the system periodically advertises other applications. In still other examples, a network-based service or an authentication component identifies other devices used by the user and provides recommended applications based upon the identified devices. For example, the system identifies that the user logs into the network-based service using a general-purpose application such as a browser on the second computing device 320. The system determines that a second application is available for the second device and advertises this availability to the user in the first application. In other examples, the system identifies that the user uses other applications from a same developer on the second computing device 320.

In some examples, GUI component 314 also provides one or more authentication sign-in screens in association with the authentication communication component 316. Authentication communication component 316 communicates with the session authentication component 334 of authentication component 332 to authenticate a user of the first computing device 310 with a network-based service. The authentication component 332 is a part of the network-based service or is a separate service—such as a federated identity service. The authentication in some examples utilizes a username and a password. The user is authenticated if the password matches a stored password for the username.

If the user expresses interest in obtaining the second application, either an image creation component 318 that is part of the first application 312 or an image creation component 340 that is part of the authentication component 332 creates an image that encodes a download location for a second application. In some examples, this image also includes a session id of an authenticated session of the user of the first application. The session id, in some examples, is assigned by the session authentication component 334 of authentication component 332. The GUI component may display the first image. This image is displayed in a GUI of the first application by GUI component 314.

Second computing device 320 includes, in some examples, an image capture component 322. The image capture component 322 in some examples is an image capture component 322 that is part of an operating system of the second computing device 320. The image capture component 322 operates one or more image capture devices of the second computing device 320. Example image capture devices include cameras, video cameras, infrared cameras, and the like.

The image capture component 322 captures the first image displayed in a GUI of the first application 312. The image capture component 322 extracts the download link for the second application 324 from the first image. The application download component 323 receives the location from the image capture component 322 and downloads the application from the location. The second application is downloaded automatically or after receiving confirmation from the user after one or more prompts.

Upon execution of the second application 324, a control component 331 determines that the second application 324 is not yet configured and starts a first-run experience which provides one or more GUI input screens through GUI component 330 that allows a user to configure the second application 324. In some examples, the second application receives, from the image capture component 322, the application download component 323, or a different component (such as an operating system of the second computing device 320) a session id that was part of the first image. In these examples, the control component 331 skips to a session copy configuration flow.

In some examples in which a session id is not passed to the second application 324, the first-run experience has a selectable GUI option to copy a session via an image. Upon selection of the selectable option to copy the session via an image, the image capture component 326 of the second application 324 is then launched and the user may capture the first image again. The control component 331 extracts the download link for the second application 324 and the session identifier from the first image. The control component 331 compares the download link to one or more known download locations of the second application 324 which is provided with the second application or is obtained from a network-based source (such as the network-based service or authentication component 332). If the download link matches one of the known download locations of the second application 324 the control component 331 determines that the download link is to download the second application 324. Instead of downloading the second application 324 (which is already downloaded), the control component 331 transitions to a session copy configuration flow.

Once the control component 331 has determined that a session copy configuration flow has been started, the control component 331 sends, via the authentication communication component 328, the session identifier to the client communication component 338 of the authentication component 332. Client communication component 338 passes the session identifier to the session copy component 336 of the authentication component 332. In some examples, the session copy component 336 causes, via the client communication component 338 a second image to be displayed by the first computing device 310. In some examples, the image creation component 340 creates the second image and send it to the first computing device 310. In other examples, the image creation component 318 of the first computing device 310 creates the second image. Encoded within the second image is an authentication secret.

The image capture component 326 of the second application captures the second image. The control component 331 extracts the authentication secret from the second image. The second application 324 then attempts to authenticate as the user, through the authentication communication component 328, with the network-based service through the authentication component 332 using the authentication secret. If the authentication secret is correct and the attempt is successful, the second application is logged into the network-based service as the same user as the first application 312.

GUI component 330 and control component 331 may then provide the functionality of the second application. For example, if the second application is a unified communication application, the GUI component 330 may show communications to and from the user (e.g., the user logged into the second application 324 and the same user logged into the first applications 312). In addition, the GUI component 330 and control component 331 may provide users with opportunities to create and send and receive new communications. Communications may include text, chat, file sharing, online meetings, and the like.

As previously noted, the authentication component 332 may include a session authentication component 334. Session authentication component 334 authenticates users to a network-based service. For example, by comparing credentials to stored credentials of a user. Once a user is authenticated a session is created with a session id and an authentication secret is assigned by the session authentication component 334. The authentication secret is used in place of credentials for subsequent requests to the network-based service. The authentication secret may be periodically changed. This protects the credentials from snooping. Session authentication component 334 may ensure that subsequent API calls utilizing an authentication secret includes the correct authentication secret for the session.

Client communication component 338 may communication to and from one or more client devices such as the first computing device 310 and the second computing device 320. Client communication component 338 may implement one or more communication protocols to communication with the client devices. Similarly, in some examples, the authentication communication components 316 and 328 also implement the same protocols.

Image creation component 340 in some examples creates one or more images for display on the first computing device 310. Example images include Quick Response (QR) codes, bar codes, images with hidden information via steganographic algorithms, and the like. In some examples, images are created at the authentication component 332 and sent to the first computing device 310. The images encode a download link, session id, authentication secret, and/or the like. In other examples, rather than images, audio files are created that encode these values. In these examples, instead of capturing images, audio is played on the first computing device and captured and decoded on the second computing device to transmit a download link, session id, and/or authentication secret. In some examples, a combination of images and audio are utilized. As noted, in some examples, the image creation component 318 creates the images instead of image creation component 340—e.g., at the direction of the authentication component 332.

Session copy component 336 controls copying of a session from the first computing device 310 to the second computing device 320. For example, session copy component 336 receives a session id from the second computing device 320. Session copy component 336 then matches that session id with another authenticated session. For example, session copy component 336 may match the session id to a session active on first computing device 310. Upon matching the session id to a session active on the first computing device 310, the session copy component 336 instructs the image creation component 318 of the first computing device 310 to create a new image with the authentication secret and display it. In other examples, upon matching the session id to a session active on the first computing device 310, the session copy component 336 instructs the image creation component 340 of the authentication component 332 to create a new image with the authentication secret. This new image is then transmitted, using the client communication component 338 to the first computing device where it is displayed.

In some examples, when the user of first computing device 310 selects a download option for the second application 324 or selects a session copy option (e.g, the GUI may provide for downloading the application only, or downloading the application AND transferring the session), the authentication communication component 316 sends a notice to the authentication component 332 that the session is to be copied. This serves as a security feature preventing a rogue second application from transferring a session without an approval from the first device. For example, without this feature, a rouge application may figure out the session id of the first application 312 and have the session copied without the user of the first application approving.

Once the authentication secret is decoded by the second application 324, the second application 324 uses this to authenticate with the session authentication component 334 of the authentication component. In some examples, the session copy component 336 may alert the session authentication component 334 of the use of the authentication secret by a second application. In other examples, and as previously noted, the authentication secret in the second image is created specifically for the second application 324.

Application service 342 may include an authentication component 344 which may control access to the applications in the application storage component 346 and/or the application download component 348 to registered users. Application storage component 346 stores and indexes applications uploaded by developers as well as product information webpages. Application download component 348 provides, in some examples, one or more product information webpages for users to browse for and select applications. Once a user selects (and optionally pays for) an application the application is downloaded by the user's device.

Authentication component 332, first computing device 310, second computing device 320, and application service 342, in some examples, communicate over a packet-based network, such as the internet. In addition, a session copy or copy as used herein comprises utilizing an authenticated session of a first application on a first device to authenticate the same user on a second application on a second device. The user may continue to maintain the authenticated state on the first application on the first device in addition to the new authenticated state for the second application.

In some examples, the second application 324 may also include an image creation component 318 that implements the functionality described herein. In some examples, second application 324 includes an image creation component 318 which may implement the same functionality as described herein. That is, the second application 324 may be able to copy a session to a third application using the same procedures described herein using images. In some examples, a first application on a first device utilizes this method to download and authenticate a second application on the same first device. For example, using a detachable camera or other input device.

Figure 4:
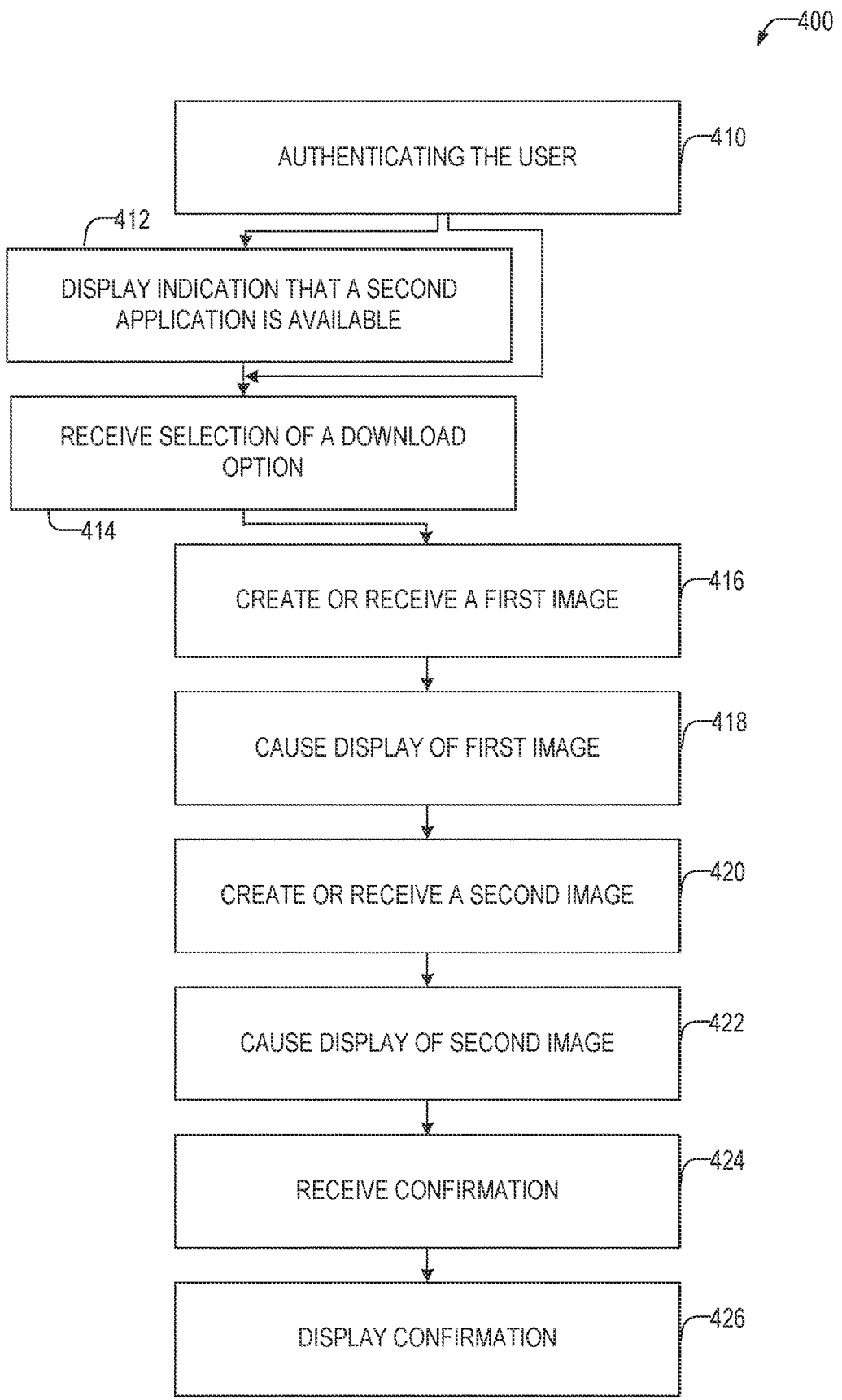
FIG. 4 illustrates a flowchart of a method of a first application according to some examples of the present disclosure.

FIG. 4 illustrates a flowchart of a method 400 of a first application according to some examples of the present disclosure. At operation 410 the first application authenticates a user to a network-based service such as through an authentication component. For example, a user enters a username and a password in a GUI provided by the first application. The username and password is encrypted or otherwise protected in some examples and sent to the authentication component. If the username and password matches the username and password of a valid account on the network-based service, the network-based service and/or the authentication component create, in some examples, a session identifier and assign a cryptographic secret. The cryptographic secret is used to authenticate subsequent requests by the first application to the network-based service.

Once the user is logged into the first application, the first application displays an indication that a second application is available for a second device at operation 412. In some examples, this is done at a first run of the first application, periodically, randomly, or the lie. In other examples, the second application or the network-based service identifies that a user logs into one or more services, such as the network-based service or another service with a second device and the indication may be displayed responsive to this determination. In other examples, the user navigates to a particular menu, such as a help menu that offers the option for a download link. At operation 414, whether from the indication, or whether the user navigates to an option in a menu, the first application receives a selection of a download option from the user within the GUI.

At operation 416, the first application creates or receives a first image. For example, the first application creates a QR code encoding a download link for a second application and/or the session identifier of the active session that was created at operation 410. The session identifier is be provided in some examples by the network-based service or the authentication component. In other examples, the first application sends an indication to the network-based service and/or authentication component that the user selected an option to download a second application and transfer the session. In these examples, the authentication component creates the QR code encoding the download link and/or the session identifier and sends it to the first application.

At operation 418 the first application causes display of the first image. For example, on a display communicatively coupled to the first computing device upon which the first application is executing. The first application utilizes, in some examples, one or more operating system calls to display the first image in the first GUI. At operation 420, the first application receives from the authentication component, or is requested to create (and creates), a second image that in some examples, encodes the authentication secret. At operation 422, the first application causes display of the second image. For example, the first application replaces the first image with the second image in a GUI. In other examples, the first application displays both the first and second GUI simultaneously.

Figure 5:
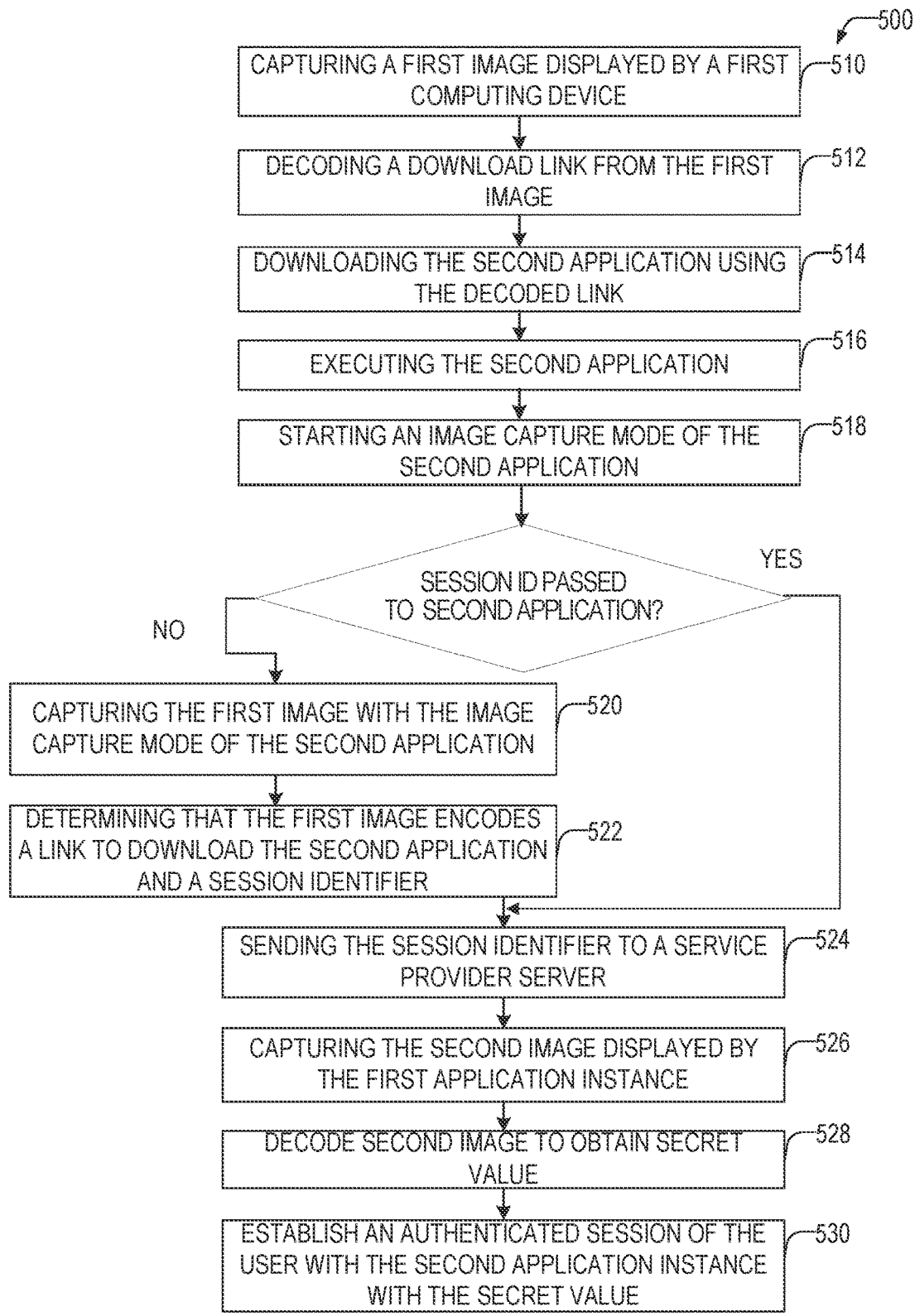
FIG. 5 illustrates a flowchart of a method of downloading and transferring a session to a second application executing on a second computing device according to some examples of the present disclosure.

At operation 424, the first application receives a confirmation from the authentication component that the second application successfully transferred the session. At operation 426, in some examples, the first application displays a confirmation message indicating that the session was successfully transferred. In some examples, the first and/or second images cease to be displayed FIG. 5 illustrates a flowchart of a method 500 of downloading and transferring a session to a second application executing on a second computing device according to some examples of the present disclosure. At operation 510, the second computing device captures a first image displayed by a first computing device (e.g., in a GUI of a first application). The image in some examples is captured using an image capture application of the second computing device. For example, an image capture application that is part of an operating system of the second device. At operation 512, the image capture application decodes the download link from the first image. In some examples, the image capture application also decodes the session identifier. At operation 514, the second device downloads the second application using the decoded link.

At operation 516, the second computing device executes the second application. For example, the second computing device automatically executes the second application after installing it, or the user selects the second application. At operation 518, the second application starts a session copy flow by starting an image capture mode of the second application. For example, the second application recognizes that it has not yet been configured and asks the user if they would like to transfer a session using an image. If the user accepts, then the image capture mode of the second application is started. Likewise, if the session id is passed as a payload to the second application, either by the operating system, the image capture component, or a download location—the second application starts a session copy flow by entering the image capture mode of the second application.

If the session id was not passed to the second application, flow proceeds to operations 520 and 522. At operation 520, the first image is captured with the image capture mode of the second application. The second application then determines at operation 522 that the first image encodes a link to download the second application and the session identifier. Flow then proceeds to operation 524.

If the session id was passed into the second application, or upon determining the session id as a result of performing operations 520 and 522, the second application sends the session id to an authentication component or a network-based service provider server—for example, over a packet-based network. This causes the network-based service provider to cause a new image to replace the first image. At operation 526, the image capture component of the second application captures the second image. At operation 528, the second image may be decoded to obtain a secret value such as the authentication secret. At operation 530, using the secret value, the second application authenticates with the network-based service (e.g., through an authentication component).

Figure 6:
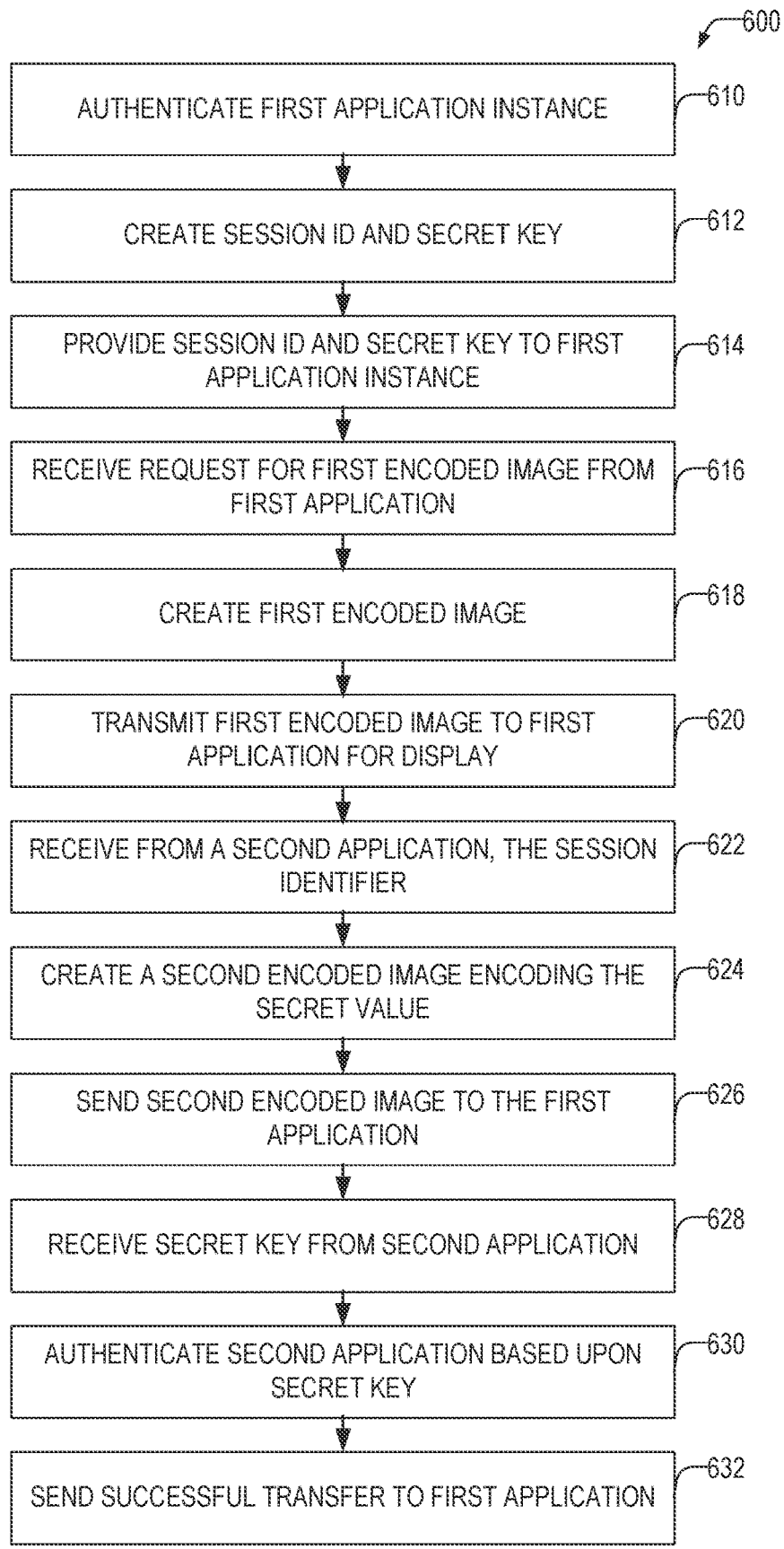
FIG. 6 illustrates a flowchart of a method of a network-based service transferring a session from a first application to a second application according to some examples of the present disclosure.

FIG. 6 illustrates a flowchart of a method 600 of a network-based service transferring a session from a first application to a second application according to some examples of the present disclosure. At operation 610, a user of the first application is authenticated. For example, the first application sends a username and password or other credentials and the network-based service checks to ensure that the username is for a valid account and the password is correct for that account. Upon authenticating the user, at operation 612, in some examples, a session is created, and a session id assigned. In addition, the secret key is created. In some examples, the session id and/or secret key (e.g., the authentication secret) are provided to the first application at operation 614. The first application uses the session id and/or secret key to call one or more Application Programming Interface calls to access services of the network-based service.

At operation 616, in some examples, the first application requests an image with a download link to a second application and a session identifier to transfer the session. In some examples, the request includes a particular version of the second application (e.g., an Android version, or an iOS version). In other examples, the first application generates the image itself (e.g., using configured download links within the first application). At operation 618, the image is created that encodes the download link and/or the session identifier. At operation 620 the image is transmitted (e.g., over a packet-based network) to the first application. As noted, the first application creates the image in some examples and as such, operations 616, 618, and 620 may not be performed in some implementations.

At operation 622, a second application provides the session identifier. This signals the network-based service that the second device downloaded the second application and is now executing it. In response, the network-based service creates a second image encoding the secret value at operation 624. At operation 626, the second image is sent to the first application for display. In other examples, the network-based service sends an instruction to the first application to create the second image encoding the secret value rather than perform operations 622 and 624.

At operation 628, the network-based service receives the secret key from the second application. For example, during an authentication attempt or a subsequent API call to access one or more services of the network-based service. Based upon the receipt of the secret key, the second application is authenticated at operation 630. At operation 632, in some examples, a successful session copy indication is provided to the first application for display.

Disclosed herein are various network-based services. These services are provided, in some examples, by one or more server computing devices, edge computing devices, and the like.

FIG. 7 illustrates a block diagram of an example machine 700 upon which any one or more of the techniques (e.g., methodologies) discussed herein may be performed. For example, the first computing device 105, 205, 310; second computing device 104, 204, 320; the authentication component 108, 208, 332; the application service 106 342.

Machine 700 may be configured by hardware and/or software to perform the methods of FIGS. 4-6. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be in the form of a personal computer (PC), a server computing device, a server computing device that is part of a service, a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 700 may include one or more hardware processors, such as processor 702. Processor 702 may be a central processing unit (CPU), a graphics processing unit (GPU), a hardware processor core, or any combination thereof. Machine 700 may include a main memory 704 and a static memory 706, some or all of which may communicate with each other via an interlink (e.g., bus) 708. Examples of main memory 704 may include Synchronous Dynamic Random-Access Memory (SDRAM), such as Double Data Rate memory, such as DDR4 or DDR5. Interlink 708 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NYC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any, one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media. (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 724 may further be transmitted or received over a communications network 726 using a transmission medium via the network interface device 720. The Machine 700 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards; a Long Term Evolution (LTE) family of standards, a Universal Mobile Telecommunications System (UMTS) family of standards, peer-to-peer (P2P) networks, among others. In an example, the network interface device 720 may, include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques.

OTHER NOTES AND EXAMPLES

Example 1 is a method of downloading a first application on a first computing device and authenticating a user on the first application using an already authenticated session of a second application executing on a second computing device, the method comprising: using a hardware processor of the first computing device: capturing, in an image capture application of the first computing device, a first image encoding a link to download the first application, the first image displayed by the second application on the second computing device; responsive to capturing the first image; decoding the link; downloading the first application from the link; responsive to downloading the first application, executing the first application, the first application: identifying, from a communication with the second computing device, a session identifier of a session between the second application and a network-based service; providing, over a network, the session identifier to the network-based service of the first application, the network-based service replacing the first image with a second image on the second computing device; capturing the second image displayed by the second application, the second image encoded with a secret value; decoding the second image to decode the secret value; and establishing an authenticated session of the user of the first application with the network-based service using the secret value.

In Example 2, the subject matter of Example 1 includes, wherein identifying, from the communication with the second computing device, the session identifier of the session between the second application and the network-based service comprises: starting an image capture mode of the first application; capturing, in the image capture mode of the first application, the first image that is displayed by the second application of the second computing device; and determining that the first image encodes both the link to download the first application and the session identifier of the authenticated session between the second application and the network-based service.

In Example 3, the subject matter of Example 2 includes, wherein responsive to determining that the first image encodes both the link to download the first application and the session identifier: recognizing that the link is to download the first application; and responsive to recognizing that the link is to download the first application, refraining from downloading the first application.

In Example 4, the subject matter of Examples 2-3 includes, wherein starting the image capture mode of the first application is responsive to receiving a selection on a user interface of the first application to establish an authenticated session using an encoded image.

In Example 5, the subject matter of Examples 1–4 includes, wherein the first and second images are Quick Response (QR) codes.

In Example 6, the subject matter of Examples 1-5 includes, wherein the second computing device is executing a different operating system than the first computing device.

In Example 7, the subject matter of Examples 1-6 includes, wherein the second application and the first application are different instances of a same application.

In Example 8, the subject matter of Examples 1-7 includes, wherein the network-based service comprises a federated authentication component.

Example 9 is a system for downloading a first application on a first computing device and authenticating a user on the first application using an already authenticated session of a second application executing on a second computing device, the system comprising: the first computing device, comprising: a hardware processor; a memory device, the memory device storing instructions, which when executed by the hardware processor, causes the first computing device to perform operations comprising: capturing, in an image capture application of the first computing device, a first image encoding a link to download the first application, the first image displayed by the second application on the second computing device; responsive to capturing the first image, decoding the link; downloading the first application from the link; responsive to downloading the first application, executing the first application, the first application: identifying, from a communication with the second computing device, a session identifier of a session between the second application and a network-based service: providing, over a network, the session identifier to the network-based service of the first application, the network-based service replacing the first image with a second image on the second computing device; capturing the second image displayed by the second application, the second image encoded with a secret value; decoding the second image to decode the secret value; and establishing an authenticated session of the user of the first application with the network-based service using the secret value.

In Example 10, the subject matter of Example 9 includes, wherein the operation of identifying, from the communication with the second computing device, the session identifier of the session between the second application and the network-based service comprises: starting an image capture mode of the first application; capturing, in the image capture mode of the first application, the first image that is displayed by the second application of the second computing device; and determining that the first image encodes both the link to download the first application and the session identifier of the authenticated session between the second application and the network-based service.

In Example 11, the subject matter of Example 10 includes, wherein the operations further comprise: responsive to determining that the first image encodes both the link to download the first application and the session identifier: recognizing that the link is to download the first application; and responsive to recognizing that the link is to download the first application, refraining from downloading the first application.

In Example 12, the subject matter of Examples 10-11 includes, wherein the operation of starting the image capture mode of the first application is responsive to receiving a selection on a user interface of the first application to establish an authenticated session using an encoded image.

In Example 13, the subject matter of Examples 9-12 includes, wherein the first and second images are Quick Response (QR) codes.

In Example 14, the subject matter of Examples 9-13 includes, wherein the second computing device is executing a different operating system than the first computing device.

In Example 15, the subject matter of Examples 9-14 includes, wherein the second application and the first application are different instances of a same application.

In Example 16, the subject matter of Examples 9-15 includes, wherein the network-based service comprises a federated authentication component.

Example 17 is a first computing device for downloading a first application on a first computing device and authenticating a user on the first application using an already authenticated session of a second application executing on a second computing device, the first computing device comprising: means for capturing; in an image capture application of the first computing device, a first image encoding a link to download the first application, the first image displayed by the second application on the second computing device; means for, responsive to capturing the first image, decoding the link; means for downloading the first application from the link; responsive to downloading the first application, means for executing the first application, the first application comprising: means for identifying, from a communication with the second computing device, a session identifier of a session between the second application and a network-based service; means for providing, over a network, the session identifier to the network-based service of the first application, the network-based service replacing the first image with a second image on the second computing device; means for capturing the second image displayed by the second application, the second image encoded with a secret value; means for decoding the second image to decode the secret value; and means for establishing an authenticated session of the user of the first application with the network-based service using the secret value.

In Example 18, the subject matter of Example 17 includes, wherein the means for identifying, from the communication with the second computing device, the session identifier of the session between the second application and the network-based service comprises: means for starting an image capture mode of the first application; means for capturing, in the image capture mode of the first application, the first image that is displayed by the second application of the second computing device; and means for determining that the first image encodes both the link to download the first application and the session identifier of the authenticated session between the second application and the network-based service.

In Example 19, the subject matter of Example 18 includes, responsive to determining that the first image encodes both the link to download the first application and the session identifier: means for recognizing that the link is to download the first application; and means for, responsive to recognizing that the link is to download the first application, refraining from downloading the first application.

In Example 20, the subject matter of Examples 18-19 includes, wherein the means for starting the image capture mode of the first application is responsive to receiving a selection on a user interface of the first application to establish an authenticated session using an encoded image.

In Example 21, the subject matter of Examples 17-20 includes, wherein the first and second images are Quick Response (QR) codes.

In Example 22, the subject matter of Examples 17-21 includes, wherein the second computing device is executing a different operating system than the first computing device.

In Example 23, the subject matter of Examples 17-22 includes, wherein the second application and the first application are different instances of a same application.

In Example 24, the subject matter of Examples 17-23 includes, wherein the network-based service comprises a federated authentication component.

Example 25 is a machine-readable medium, storing instructions for downloading a first application on a first computing device and authenticating a user on the first application using an already authenticated session of a second application executing on a second computing device, the instructions, which when performed by the first computing device, cause the first computing device to perform operations comprising: capturing, in an image capture application of the first computing device, a first image encoding a link to download the first application, the first image displayed by the second application on the second computing device; responsive to capturing the first image, decoding the link; downloading the first application from the link; responsive to downloading the first application, executing the first application, the first application: identifying, from a communication with the second computing device, a session identifier of a session between the second application and a network-based service; providing, over a network, the session identifier to the network-based service of the first application, the network-based service replacing the first image with a second image on the second computing device; capturing the second image displayed by the second application, the second image encoded with a secret value; decoding the second image to decode the secret value; and establishing an authenticated session of the user of the first application with the network-based service using the secret value.

In Example 26, the subject matter of Example 25 includes, wherein the operation of identifying, from the communication with the second computing device, the session identifier of the session between the second application and the network-based service comprises: starting an image capture mode of the first application; capturing, in the image capture mode of the first application, the first image that is displayed by the second application of the second computing device; and determining that the first image encodes both the link to download the first application and the session identifier of the authenticated session between the second application and the network-based service.

In Example 27, the subject matter of Example 26 includes, wherein the operations further comprise: responsive to determining that the first image encodes both the link to download the first application and the session identifier: recognizing that the link is to download the first application; and responsive to recognizing that the link is to download the first application, refraining from downloading the first application.

In Example 28, the subject matter of Examples 26-27 includes, wherein the operation of starting the image capture mode of the first application is responsive to receiving a selection on a user interface of the first application to establish an authenticated session using an encoded image.

In Example 29, the subject matter of Examples 25-28 includes, wherein the first and second images are Quick Response (QR) codes.

In Example 30, the subject matter of Examples 25-29 includes, wherein the second computing device is executing a different operating system than the first computing device.

In Example 31, the subject matter of Examples 25-30 includes, wherein the second application and the first application are different instances of a same application.

In Example 32, the subject matter of Examples 25-31 includes, wherein the network-based service comprises a federated authentication component.

Example 33 is at least one machine-readable medium including instructions that, when executed by processing circuitry, cause the processing circuitry to perform operations to implement of any of Examples 1-32.

Example 34 is an apparatus comprising means to implement of any of Examples 1-32.

Example 35 is a system to implement of any of Examples 1-32.

Example 36 is a method to implement of any of Examples 1-32.

What is claimed is:

1. A method of downloading a first application on a first computing device and authenticating a user on the first application using an already authenticated session of a second application executing on a second computing device, the method comprising:
    using a hardware processor of the first computing device:
        capturing, in an image capture application of the first computing device, a first image encoding a link to download the first application, the first image displayed by the second application on the second computing device;
        responsive to capturing the first image, decoding the link;
        downloading the first application from the link;
        responsive to downloading the first application, executing the first application, the first application:
            identifying, from a communication with the second computing device, a session identifier of a session between the second application and a network-based service;
            providing, over a network, the session identifier to the network-based service of the first application, the network-based service replacing the first image with a second image on the second computing device;
            capturing the second image displayed by the second application, the second image encoded with a secret value;
            decoding the second image to decode the secret value; and
            establishing an authenticated session of the user of the first application with the network-based service using the secret value.

2. The method of claim 1, wherein identifying, from the communication with the second computing device, the session identifier of the session between the second application and the network-based service comprises:
    starting an image capture mode of the first application;
    capturing, in the image capture mode of the first application, the first image that is displayed by the second application of the second computing device; and
    determining that the first image encodes both the link to download the first application and the session identifier of the authenticated session between the second application and the network-based service.

3. The method of claim 2, wherein responsive to determining that the first image encodes both the link to download the first application and the session identifier:
    recognizing that the link is to download the first application; and
    responsive to recognizing that the link is to download the first application, refraining from downloading the first application.

4. The method of claim 2, wherein starting the image capture mode of the first application is responsive to receiving a selection on a user interface of the first application to establish an authenticated session using an encoded image.

5. The method of claim 1, wherein the first and second images are Quick Response (QR) codes.

6. The method of claim 1, wherein the second computing device is executing a different operating system than the first computing device.

7. The method of claim 1, wherein the second application and the first application are different instances of a same application.

8. The method of claim 1, wherein the network-based service comprises a federated authentication component.

9. A system for downloading a first application on a first computing device and authenticating a user on the first application using an already authenticated session of a second application executing on a second computing device, the system comprising:
    the first computing device, comprising:
        a hardware processor;
        a memory device, the memory device storing instructions, which when executed by the hardware processor, causes the first computing device to perform operations comprising:
            capturing, in an image capture application of the first computing device, a first image encoding a link to download the first application, the first image displayed by the second application on the second computing device;
            responsive to capturing the first image, decoding the link;
            downloading the first application from the link;
            responsive to downloading the first application, executing the first application, the first application:
                identifying, from a communication with the second computing device, a session identifier of a session between the second application and a network-based service;
                providing, over a network, the session identifier to the network-based service of the first application, the network-based service replacing the first image with a second image on the second computing device;
                capturing the second image displayed by the second application, the second image encoded with a secret value;
                decoding the second image to decode the secret value; and
                establishing an authenticated session of the user of the first application with the network-based service using the secret value.

10. The system of claim 9, wherein the operation of identifying, from the communication with the second computing device, the session identifier of the session between the second application and the network-based service comprises:
  starting an image capture mode of the first application;
  capturing, in the image capture mode of the first application, the first image that is displayed by the second application of the second computing device; and
  determining that the first image encodes both the link to download the first application and the session identifier of the authenticated session between the second application and the network-based service.

11. The system of claim 10, wherein the operations further comprise:
  responsive to determining that the first image encodes both the link to download the first application and the session identifier:
    recognizing that the link is to download the first application; and
    responsive to recognizing that the link is to download the first application, refraining from downloading the first application.

12. The system of claim 10, wherein the operation of starting the image capture mode of the first application is responsive to receiving a selection on a user interface of the first application to establish an authenticated session using an encoded image.

13. The system of claim 9, wherein the first and second images are Quick Response (QR) codes.

14. The system of claim 9, wherein the second computing device is executing a different operating system than the first computing device.

15. The system of claim 9, wherein the second application and the first application are different instances of a same application.

16. The system of claim 9, wherein the network-based service comprises a federated authentication component.

17. A first computing device for downloading a first application on a first computing device and authenticating a user on the first application using an already authenticated session of a second application executing on a second computing device, the first computing device comprising:
  means for capturing, in an image capture application of the first computing device, a first image encoding a link to download the first application, the first image displayed by the second application on the second computing device;
  means for, responsive to capturing the first image, decoding the link;
  means for downloading the first application from the link;
  responsive to downloading the first application, means for executing the first application, the first application comprising:
    means for identifying, from a communication with the second computing device, a session identifier of a session between the second application and a network-based service;
    means for providing, over a network, the session identifier to the network-based service of the first application, the network-based service replacing the first image with a second image on the second computing device;
    means for capturing the second image displayed by the second application, the second image encoded with a secret value;
    means for decoding the second image to decode the secret value; and
    means for establishing an authenticated session of the user of the first application with the network-based service using the secret value.

18. The first computing device of claim 17, wherein the means for identifying, from the communication with the second computing device, the session identifier of the session between the second application and the network-based service comprises:
  means for starting an image capture mode of the first application;
  means for capturing, in the image capture mode of the first application, the first image that is displayed by the second application of the second computing device; and
  means for determining that the first image encodes both the link to download the first application and the session identifier of the authenticated session between the second application and the network-based service.

19. The first computing device of claim 18, further comprising:
  responsive to determining that the first image encodes both the link to download the first application and the session identifier:
    means for recognizing that the link is to download the first application; and
    means for, responsive to recognizing that the link is to download the first application, refraining from downloading the first application.

20. The first computing device of claim 18, wherein the means for starting the image capture mode of the first application is responsive to receiving a selection on a user interface of the first application to establish an authenticated session using an encoded image.

* * * * *